US007605689B2

(12) United States Patent

Hein et al.

(10) Patent No.: US 7,605,689 B2

(45) Date of Patent: Oct. 20, 2009

(54) REMOTE CONTROL WITH ENERGY HARVESTING

(75) Inventors: David A. Hein, Sterling Heights, MI (US); Pawel W. Sleboda, Bloomfield Hills, MI (US)

(73) Assignee: Lear Corporation, Southfield, MI (US)

( * ) Notice: Subject to any disclaimer, the term of this patent is extended or adjusted under 35 U.S.C. 154(b) by 307 days.

(21) Appl. No.: 11/734,010

(22) Filed: Apr. 11, 2007

(65) Prior Publication Data

US 2008/0252432 A1 Oct. 16, 2008

(51) Int. Cl.

*B60R 25/10* (2006.01)
*H01M 10/44* (2006.01)

(52) U.S. Cl. ................................ 340/426.15; 320/101

(58) Field of Classification Search ............................... 340/825.36–825.39, 825.72, 426, 426.11–426.15, 340/5.2, 5.72; 375/225; 320/101, 132; 70/264
See application file for complete search history.

(56) References Cited

U.S. PATENT DOCUMENTS

| | | | | |
|---|---|---|---|---|
| 6,114,830 | A * | 9/2000 | Luo | 320/101 |
| 6,489,746 | B1 * | 12/2002 | Pettinato | 320/111 |
| 6,617,975 | B1 * | 9/2003 | Burgess | 340/815.47 |
| 6,624,758 | B1 * | 9/2003 | Omata et al. | 340/426.36 |
| 6,879,068 | B2 | 4/2005 | Matsuzawa | |
| 6,906,436 | B2 | 6/2005 | Jenson et al. | |
| 6,965,295 | B2 * | 11/2005 | Shimonomoto et al. | 340/5.61 |
| 6,986,965 | B2 | 1/2006 | Jenson et al. | |
| 7,057,330 | B2 | 6/2006 | Buhler et al. | |
| 7,433,655 | B2 * | 10/2008 | Jacobs et al. | 455/90.3 |
| 2002/0074898 | A1 | 6/2002 | Maue et al. | |
| 2005/0073221 | A1 | 4/2005 | Albsmeier et al. | |
| 2005/0134477 | A1 * | 6/2005 | Ghabra et al. | 340/825.72 |
| 2005/0166651 | A1 * | 8/2005 | Stoschek et al. | 70/264 |
| 2008/0252174 | A1 * | 10/2008 | Mohammadi et al. | 310/319 |

* cited by examiner

*Primary Examiner*—Benjamin C Lee
*Assistant Examiner*—Sigmund Tang
(74) *Attorney, Agent, or Firm*—Brooks Kushman P.C.

(57) ABSTRACT

A remote control includes energy harvesting that provides power in addition to a battery. The energy harvesting and the battery may be switchably used to power transmit operations, receive operation, and/or display operations. The remote control may be used as part of an automotive vehicle remote keyless entry system in which vehicle status is displayed by the remote control.

17 Claims, 3 Drawing Sheets

REMOTE CONTROL WITH ENERGY HARVESTING

BACKGROUND OF THE INVENTION

1. Field of the Invention

The present invention relates to powering or using remote controls.

2. Background Art

Remote controls provide convenience to users. However, their portability generally requires that they rely on battery power for operation. This is particularly true with remote keyless entry (RKE) systems for automotive vehicles.

For example, two-way remote controls have the ability to both send commands to and display the status of the remotely controlled device. One issue associated with two-way RKE systems is the conflict between maintaining battery life and providing a continuously updated status display. The constant transmissions between a key fob and the vehicle consume battery power in the key fob.

SUMMARY OF THE INVENTION

The present invention provides a remote control that includes energy harvesting. In one embodiment, a key fob combines a battery with an energy harvesting system to extend the battery life and increase the usefulness of the key fob. In various embodiments, remote control functions may be provided by the battery, the energy harvesting system, or a combination of both based on energy availability and other factors.

DETAILED DESCRIPTION OF THE PREFERRED EMBODIMENT(S)

Figure 1:
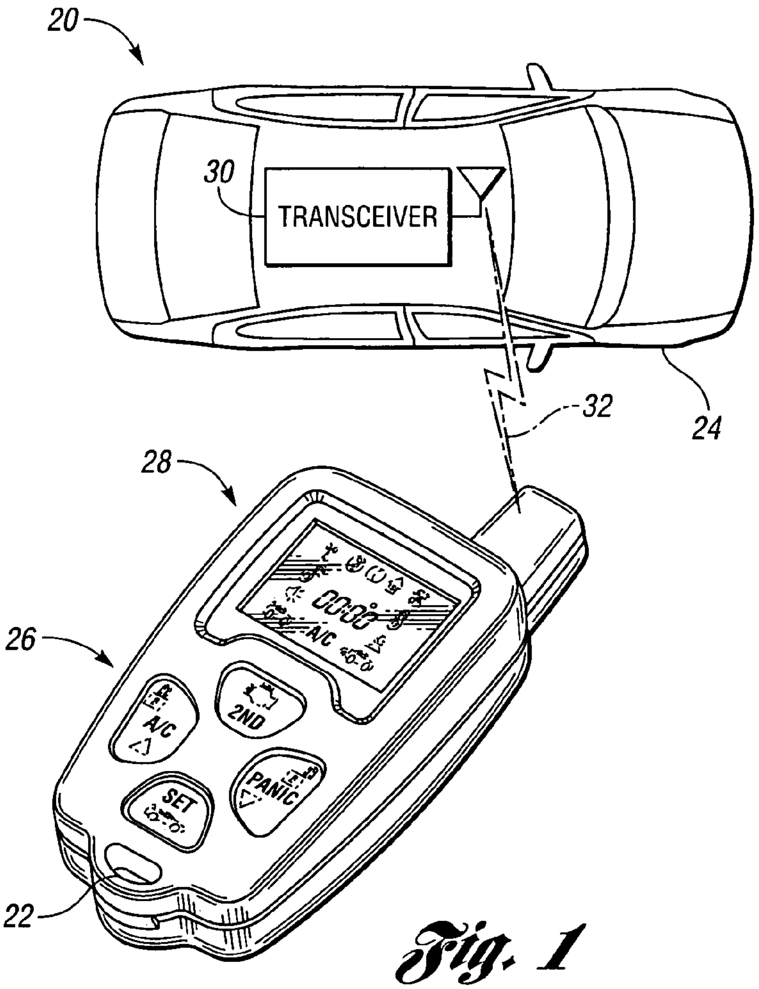
FIG. 1 is a block diagram illustrating a remote keyless entry system according to an embodiment of the present invention.

Referring to FIG. 1, a block diagram illustrating a remote keyless entry system according to an embodiment of the present invention is shown. An automotive remote keyless entry system, shown generally by 20, includes remote control 22 in two-way communication with vehicle 24. Remote control 22 is in the form of a portable, hand-held key fob including user input, shown generally by 26, and user display, shown generally by 28.

Vehicle 24 includes transceiver 30 for establishing two-way communication link 32 with remote control key fob 22. Communication link 32 allows commands from key fob 22 to be implemented by vehicle 24 and allows the status of vehicle 24 to be sent to key fob 22 for display. Communication link 32 is preferably implemented by modulating an electromagnetic carrier wave such as, for example, a radio frequency carrier. More than one frequency may be used, such as a separate channel for transmission and reception or for establishing communications and for transmitting information. The present invention is not limited by the type of communication link established.

Various types of commands may be sent by remote control fob 22 to initiate various functions in vehicle 24. These include one or more of door lock and unlock, trunk open and close, window open and close, alarm arm and disarm, remote start, lights on and off, panic alarm, vehicle temperature control, vehicle location indication, temperature control, on-demand status check, and the like. Various vehicle status may be sent by fob 22 by vehicle 24. These include one or more of control function status (e.g., door locked), internal temperature, external temperature, warning or alarm conditions, fluid levels, engine condition, vehicle intrusion or theft detection, and the like.

While the present invention has been described in relation to a vehicle key fob, various other embodiments are possible. The present invention may be applied as a remote control for entry into various structures including houses, commercial buildings, gated areas, garages, and the like. The present invention may also be applied to controlling various devices including lights, alarms, gates, doors, consumer electronics, environmental controls, and the like.

Figure 2:
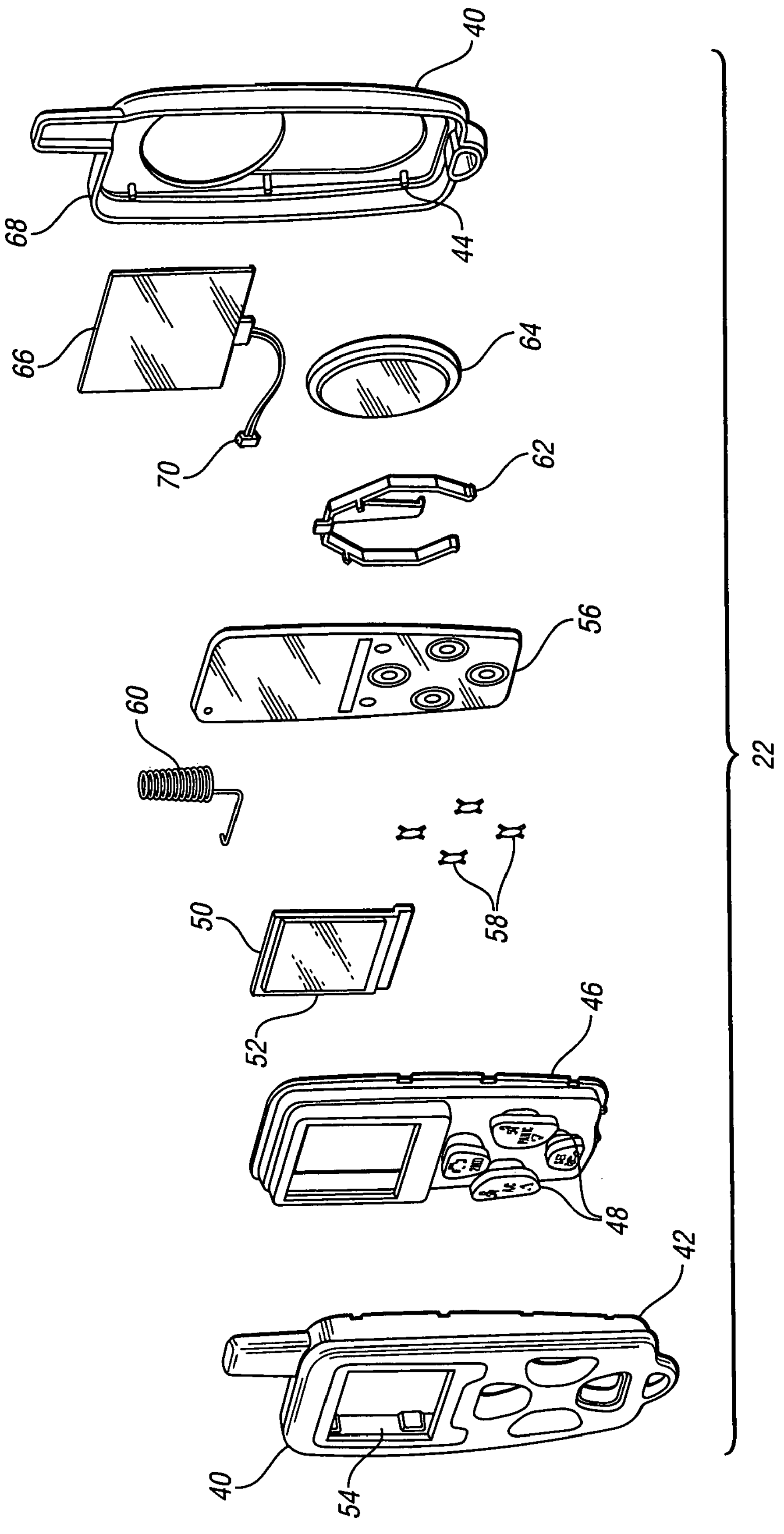
FIG. 2 is an exploded view diagram illustrating a remote control according to an embodiment of the present invention.

Referring now to FIG. 2, an exploded view diagram illustrating a remote control according to an embodiment of the present invention is shown. Remote control 22 includes housing 40 formed by front housing section 42 and rear housing section 44. Support frame 46 is disposed within housing 40 to provide support for keys 48 providing user input. Display board 50 caries LCD graphical display 52, which is positioned in support frame 46 so that graphical display 52 shows through window 54 in front housing section 42. Graphical display 52 is soldered onto printed circuit board 56.

Printed circuit board 56 supports key caps or snap domes 58 which make electrical connections for user keys 48 on the front side of printed circuit board 56. Antenna 60 is affixed to the front side of printed circuit board 56 to provide a two-way radio frequency channel. Battery clip 62 is affixed to the back side of printed circuit board 56 to hold and provide electrical connectivity for battery 64. Battery 64 may be a type CR2032, CR2045, or any other suitable battery. Various circuit elements, including resistors, capacitors, integrated circuit chips, and the like, are soldered onto the back side of printed circuit board 56.

Solar panel 66 is positioned to receive light through window 68 in back housing section 44. Solar panel 66 converts the received light into electricity delivered to printed circuit board 56 through wiring 70 mating with a connector on the back side of printed circuit board 56. If a user desires to use remote control 22, the user will likely have remote control 22 out in the open, where remote control 22 is exposed to ambient light. Remote control 22 would then generate and store energy for remote control functions including communication, display, and the like.

In another embodiment, solar panel 66 may be supplemented with or replaced by a mechanical-to-electrical energy converter that converts motion of remote control 22 into electrical energy. Such devices may be implemented with piezoelectric materials stressed by an attached mass, magnetic slugs moving through conductive coils, and the like as is known in the art. If a user has remote control 22 in his possession, remote control 22 is moving with the user and would be generating and storing energy for remote control functions including communication, display, and the like.

Figure 3:
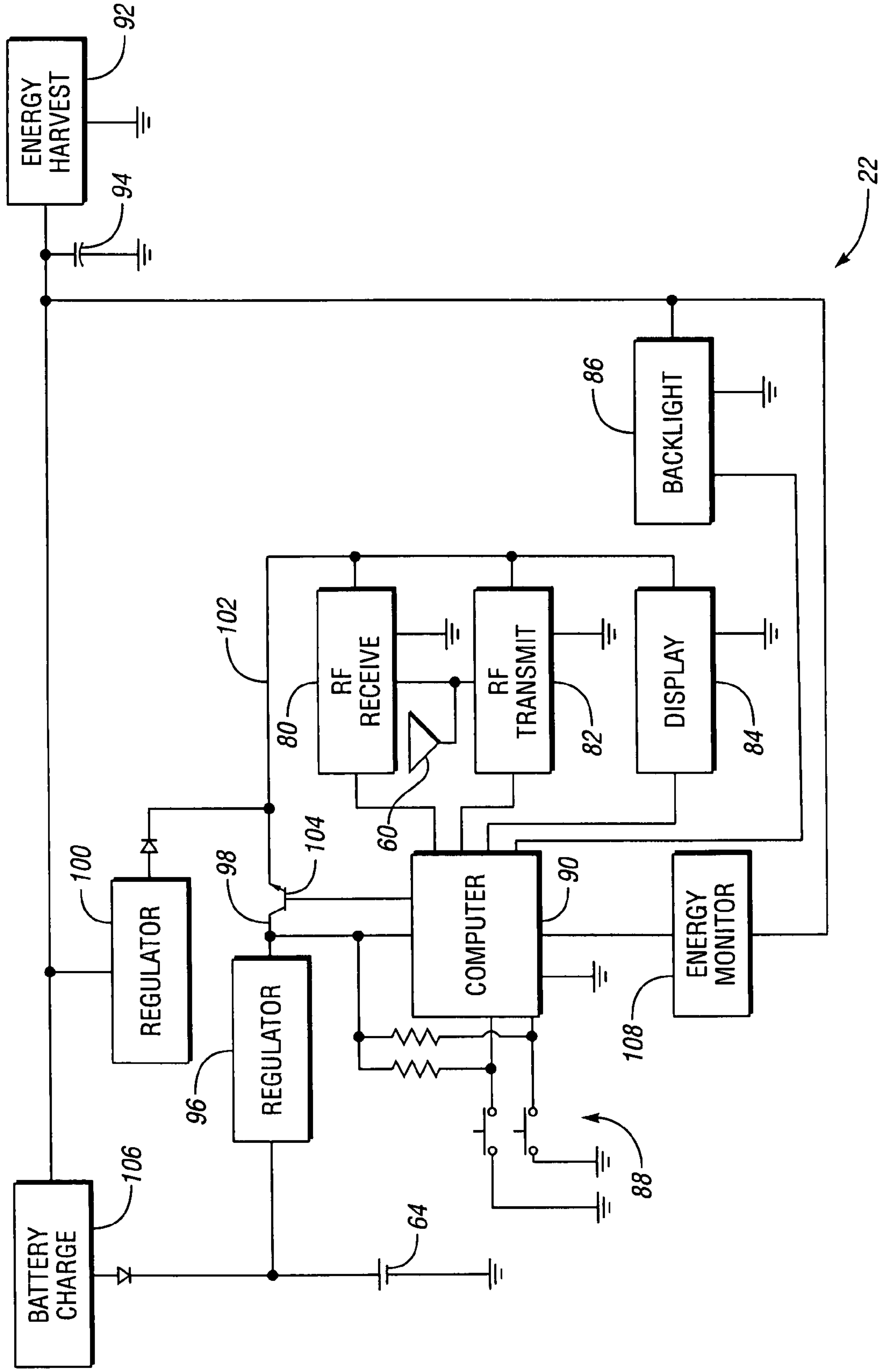
FIG. 3 is a block diagram illustrating a remote control according to an embodiment of the present invention.

Referring now to FIG. 3, a block diagram illustrating a remote control according to an embodiment of the present invention is shown. Remote control 22 includes RF receive circuit 80 and RF transmit circuit 82 sharing common antenna 60. RF transmit circuit 82 may be used to modulate commands for transmission by antenna 60. RF receive circuit may be used to demodulate status information received by antenna 60. Many alternatives are possible. RF transmit circuit 82 and RF receive circuit 80 may use separate antennas. RF transmit circuit 82 and RF receive circuit 80 may be combined into a transceiver circuit. One or both may be augmented or replaced with an optical or infrared circuit or other transmission support circuit as is known in the art.

In one embodiment, display 84 may provide the user with status information received by remote control 22. Display 84 may also provide the user with other information, such as time, date, temperature, location, direction, battery status, harvested energy status, and the like. Display 84 is preferably a graphical display, but may also be augmented with or replaced by single indicator lamps and/or audible sounds. The term display is meant to indicate any form of user notification. Display 84 may be implemented with, for example, one or more of a liquid crystal display panel, light emitting diodes, light emitting polymers, incandescent lamps, fluorescent lamps, piezoelectric or electromechanical sound transducers, and the like. Depending upon the type of display 84, remote control 22 may include backlight 86 for illuminating display 84.

In an embodiment, remote control 22 includes user input 88. User input 88 may allow a user to specify which commands are transmitted by remote control 22. User input 88 may also allow the user to access functions provided by remote control 22 such as, for example, display the current time. User input 88 are preferably implemented as discrete switches. However, any form of user inputs may be used to replace or augment discrete switches, including a touch screen, touch pad, joy stick, multi-function switches, sound transducer(s) for audible commands, and the like.

In the embodiment shown, computer 90 provides control logic for remote control 22. Computer 90 sends commands to transmitter 82, receives transmissions from receiver 80, sends information to be displayed to display 84, receives input signals from user input 88, controls backlight 86, and the like. Computer 90 is preferably implemented with a microprocessor such as, for example, the PIC16F91 from Microchip Technology Inc. of Chandler, Ariz.; the MSP430F413 from Texas Instruments Inc. of Dallas, Tex.; the EM6625 from EM Microelectronic-Marin SA of Marin, Switzerland; or the like. Computer 90 may include one or more of programmable logic, discrete logic, firmware, software, and the like. The functions of computer 90 may also be distributed between a plurality of devices or components.

In the embodiment shown, remote control 22 includes battery 64 and energy harvest component 92. Battery 64 generates electricity through a chemical processes. Energy harvest component 92 generates electricity through a non-chemical process such as, for example, by converting light into electricity, converting motion into electricity, or the like. Electrical energy generated by harvest component 92 is stored in capacitor 94.

Regulators may be used to regulate the voltage levels on power supply busses. Regulator 96 regulates the voltage output from battery 64 as supplied to battery-only bus 98. Regulator 100 regulates the voltage stored in capacitor 94 as supplied to switched bus 102. Circuits for regulating voltage levels are well known in the electronic arts.

Switch 104 switches battery-only bus 98 onto switched bus 102 under the control of computer 90. Switch 104 is preferably a solid state switch such as, for example, bipolar transistor(s), MOS transistor(s), biCMOS transistor(s), diode(s), and the like. Switch 104 may also be implemented with one or more electromechanical switch such as a relay.

In the embodiment shown, remote control 22 provides a wide variety of powering options, including unregulated harvested energy, regulated harvested energy, battery-only power, and switched harvested-battery energy. In this example, backlight 86 is powered by unregulated harvested energy; transmitter 80, receiver 82, and display 84 are powered from switched bus 102; and computer 90 and user input 88 are powered from battery-only bus 98. It is within the scope of the present invention to power various functions and components in remote control 22 by any of the available powering options based on the needs and constraints of the particular application, including the type the remote control, type of battery(s), type of energy harvesting system(s), types of functions and components, energy requirements of functions and components, usage patterns for the remote control, and the like.

If more than one powering option for driving a particular component or function is available within remote control 20, decisions concerning which powering option to use may be based on a variety of factors. For example, a user request to transmit a command may always be switched to battery power. Alternatively, a check may be made to see if sufficient harvested energy exists and, if so, harvested energy is used to transmit the command. This latter option may be used to save on battery power.

In another option, display 84 may be on continuously if sufficient harvested energy is available. If not, display 84 may be activated only in response to user input or input provided by receive circuitry 80.

In yet another option, transmissions by transmitter 82 requesting status and/or reception of status information by receiver 80 may only occur if sufficient harvested energy is available. Alternatively, or in addition to this option, one or both of these functions may be battery powered under certain situations such as, for example, if specifically requested by a user, if a sufficient time since a last status update has occurred, if the remote control is in a particular predefined state, and the like.

Depending upon the type of battery(s) 64 used, among other factors, remote control 22 may include battery charge circuit 106. In an embodiment of the present invention, battery charge circuit 106 charges battery 64, as needed, when sufficient energy is available from energy harvest system 92.

Remote control 22 may include energy monitor circuit 108 for determining the amount of energy available from energy harvesting. The output of energy monitoring is made available to computer 90 for use in decisions regarding which components or functions to activate and how these components or functions should be powered. In one embodiment, the output from energy monitor 108 may be used to control switch 104. In another embodiment, the output from energy monitor 108 may be used to determine whether to use, or when to use, one or more of receiver 80, transmitter 82, display 84, and the like. Energy monitor 108 may be implemented, for example, with an analog-to-digital converter monitoring the voltage level of capacitor 94. In alternative implementations, energy monitor 108 may be a separate circuit and/or may monitor one or more other parameters of energy harvest system 92.

Figure 4:
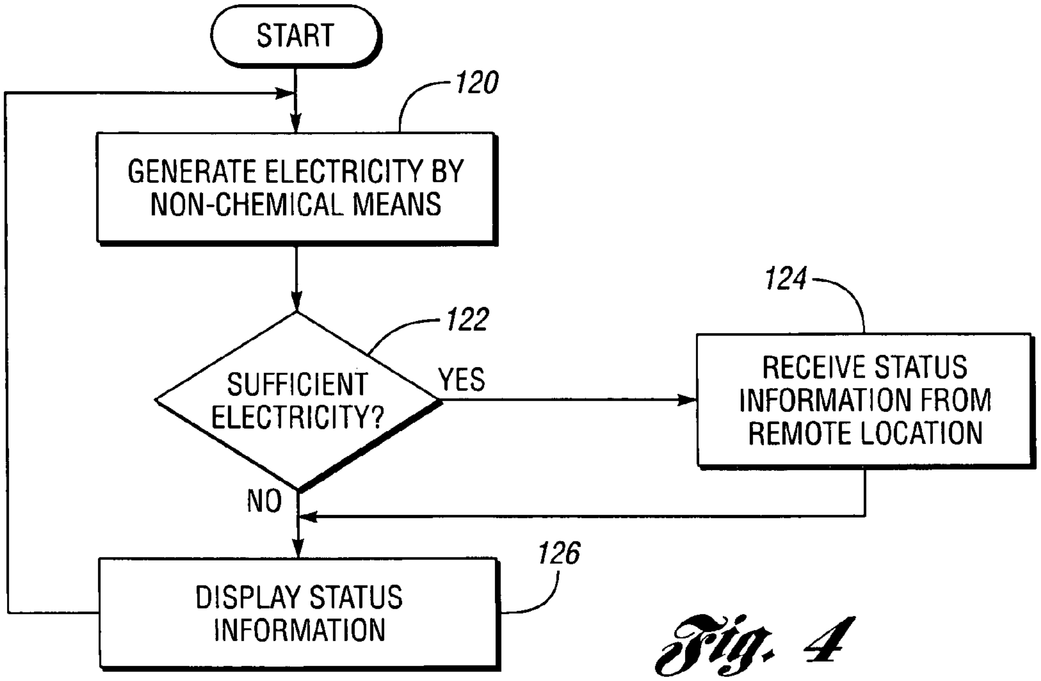
FIG. 4 is a flow diagram illustrating a method of operating a remote control according to an embodiment of the present invention.

Referring now to FIG. 4, a flow diagram illustrating a method of operating a remote control according to an embodiment of the present invention is shown. As will be appreciated by one of ordinary skill in the art, the operations illustrated are not necessarily sequential operations. The order of steps may be modified within the spirit and scope of the present invention and the order shown here is for logical presentation. Also, methods illustrated may be implemented by any combination of hardware, software, firmware, and the like, at one location or distributed. The present invention transcends any particular implementation and the embodiments are shown in sequential flow chart form merely for ease of illustration.

Electricity is generated within the remote control by non-chemical means, as in block 120. One or more various forms of energy harvesting may be used such as, for example, converting motion of the remote control into electrical energy, converting light striking the remote control into electrical energy, and the like.

A determination is made as to whether or not sufficient energy is available within the remote control, as in block 122. In one embodiment, the amount of energy available from energy harvesting is measured to determine if sufficient energy is available. In another embodiment, the determination is made implicitly by the ability of the desired function or component to operate with the available energy.

If sufficient energy is available, status is received from a location distant from the remote control, as in block 124. The status is displayed, as in block 126. The status may be displayed as it is received, when requested by a user, when sufficient power is available, and the like. The most recently received status may be stored so that, when recent status is not received, some information is still available. An indication of the status age or time received may also be displayed, as well as an indication of whether or not the remote control is actively receiving updates.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. A remote control comprising:

a portable housing;

a user input;

a transmitter and a receiver disposed within the housing, the transmitter operative to send commands, the receiver operative to receive vehicle status from a vehicle;

a display disposed within the housing;

a battery disposed within the housing;

at least one energy harvesting system disposed within the housing, the energy harvesting system operative to supply power to at least one of the receiver, the transmitter, and the display;

a power control switch disposed within the housing, the power control switch operative to interconnect the battery with at least one of the receiver, the transmitter, and the display; and control logic in communication with the power control switch and disposed within the housing, the control logic operative to control the power control switch based on at least one of the user input and an availability of energy from the energy harvesting system;

wherein the control logic is further operative to control the receiver to receive the vehicle status only when energy is determined by the control logic to be available from the at least one energy harvesting system to update the display with the received vehicle status.

2. The remote control of claim 1 wherein the energy harvesting system comprises a light-to-electricity converter.

3. The remote control of claim 1 wherein the energy harvesting system comprises a motion-to-electricity converter.

4. The remote control of claim 1 wherein the energy harvesting system comprises a capacitor for storing harvested energy.

5. The remote control of claim 1 further comprising a battery charging circuit operative to charge the battery from the energy harvesting system.

6. The remote control of claim 1 further comprising a light for illuminating the display, wherein the light is powered solely by the energy harvesting system.

7. The remote control of claim 1 wherein the control logic is operative to sense an amount of energy available from the at least one energy harvesting system.

8. The remote control of claim 7 wherein the control logic receives user input indicating a command and, if the amount of energy available from the at least one energy harvesting system is less than needed, use battery power to transmit the command.

9. A method of using a remote control for controlling at least one vehicle function in an automotive vehicle separated from the remote control, the remote control having a display, the method comprising:

generating energy through energy harvesting within the remote control, the energy harvesting separate from energy supplied by a battery within the remote control;

determining by a control logic if a sufficient amount of energy from energy harvesting is available; if sufficient then periodically receiving vehicle status from the automotive vehicle; and displaying the vehicle status on the remote control display.

10. The method of claim 9 wherein generating energy comprises converting light striking the remote control into electricity.

11. The method of claim 9 wherein generating energy comprises converting motion of the remote control into electricity.

12. The method of claim 9 further comprising using energy generated through energy harvesting to charge the battery.

13. The method of claim 9 further comprising:

determining the available amount of energy generated through energy harvesting;

receiving a request to remotely control the at least one vehicle function; and transmitting the request using energy from the battery if the determined amount of the available energy generated through energy harvesting is below a threshold.

14. The method of claim 9 further comprising:

receiving a request to remotely control the at least one vehicle function; and transmitting the request using energy from the battery.

15. The method of claim 11 further comprising switchably connecting the battery to at least one of a transmitter within the remote control, a receiver within the remote control; and a user display within the remote control.

16. A remote control comprising:

at least one battery within the remote control;

at least one supplemental power supply device within the remote control, the supplemental power supply converting at least one of motion and light into electricity, the at least one supplemental power supply device connected to a power bus within the remote control;

a control logic:

a switch for switchably connecting the at least one battery to the power bus; and a display connected to the power bus, the display operative to display information about a device controllable by the remote control, wherein the display displays the information only when energy is determined by the control logic to be available from the at least one supplemental power supply device.

17. The remote control of claim 16 further comprising at least one of a transmitter connected to the power bus and a receiver connected to the power bus.

* * * * *